United States Patent [19]
Marks et al.

[11] 3,984,112
[45] Oct. 5, 1976

[54] PHONOGRAPH TURNTABLE AND MAT ASSEMBLY

[75] Inventors: Larry D. Marks, St. Joseph; Lynn D. Palmer, Coloma, both of Mich.; Theodore F. Jensen, Huntington, N.Y.

[73] Assignee: Avnet, Inc., New York, N.Y.Y

[22] Filed: Dec. 18, 1974

[21] Appl. No.: 533,879

[52] U.S. Cl. .............................................. 274/39 R
[51] Int. Cl.² ......................................... G11B 3/60
[58] Field of Search ................... 274/39 R, 9 R, 1 R

[56] References Cited
UNITED STATES PATENTS

| | | | |
|---|---|---|---|
| 1,163,566 | 12/1915 | Scotford | 274/39 R |
| 1,399,171 | 12/1921 | Vasselli | 274/39 R |
| 1,508,632 | 9/1924 | Whitman | 274/39 R |
| 2,069,827 | 2/1937 | Harrison | 274/39 R |
| 3,309,094 | 3/1967 | Stanton | 274/9 R |
| 3,346,262 | 10/1967 | Reed | 274/39 R |
| 3,420,397 | 1/1969 | Miller | 229/43 |

*Primary Examiner*—Richard E. Aegerter
*Assistant Examiner*—John W. Shepperd
*Attorney, Agent, or Firm*—Richard P. Crowley

[57] ABSTRACT

A record player turntable has a substantially flat circular metallic top and an integral substantially cylindrical downwardly extending metallic flange and a resilient mat having a circular top portion covering the aforesaid circular metal top portion and having an integral downwardly extending resilient flange gripping the said metallic flange. The connection between the horizontal metal turntable top and its connected vertically extending flange consists of an integral diagonal web of the metallic flange flared downwardly and outwardly. This web has grooves providing for a lodgment and gripping action on the part of the circular downwardly extending rim of the inverted pan-shaped plastic mat that covers the turntable top and it also forms part of the exposed substantially cylindrical lateral face of the turntable. A horizontally outwardly facing annular groove is formed in the aforesaid web adjacent its upper end, and an annular vertically upwardly facing groove providing a substantially square annular shoulder or bead remaining between said annular grooves is also formed in the web. The upper lip of the horizontal outwardly facing groove is preferably tapered externally downwardly and outwardly to assist expansion of the flange radially during application of the mat. A mat of organic composition of some elasticity (molded elastic polymeric material) has a disc-like top and a depending outwardly flaring frustoconical flange, the lower edge and margin of which flange is forced into the upwardly facing annular groove of the metal turntable, and simultaneously a substantially radially inwardly projecting rib on the inside surface of the depending flange of the mat is forced into the horizontally facing groove where said rib of the mat is held against vertical upward displacement partially by its circumferential grip in tension and, if desired, partly by the radial inward compression produced upon forcing the lower margin of the flange of the mat into the upwardly facing circular groove formed in the aforesaid web. The finished turntable gives the appearance of a thick plastic cushion bounded at its lower side edge by a polished metal band.

5 Claims, 4 Drawing Figures

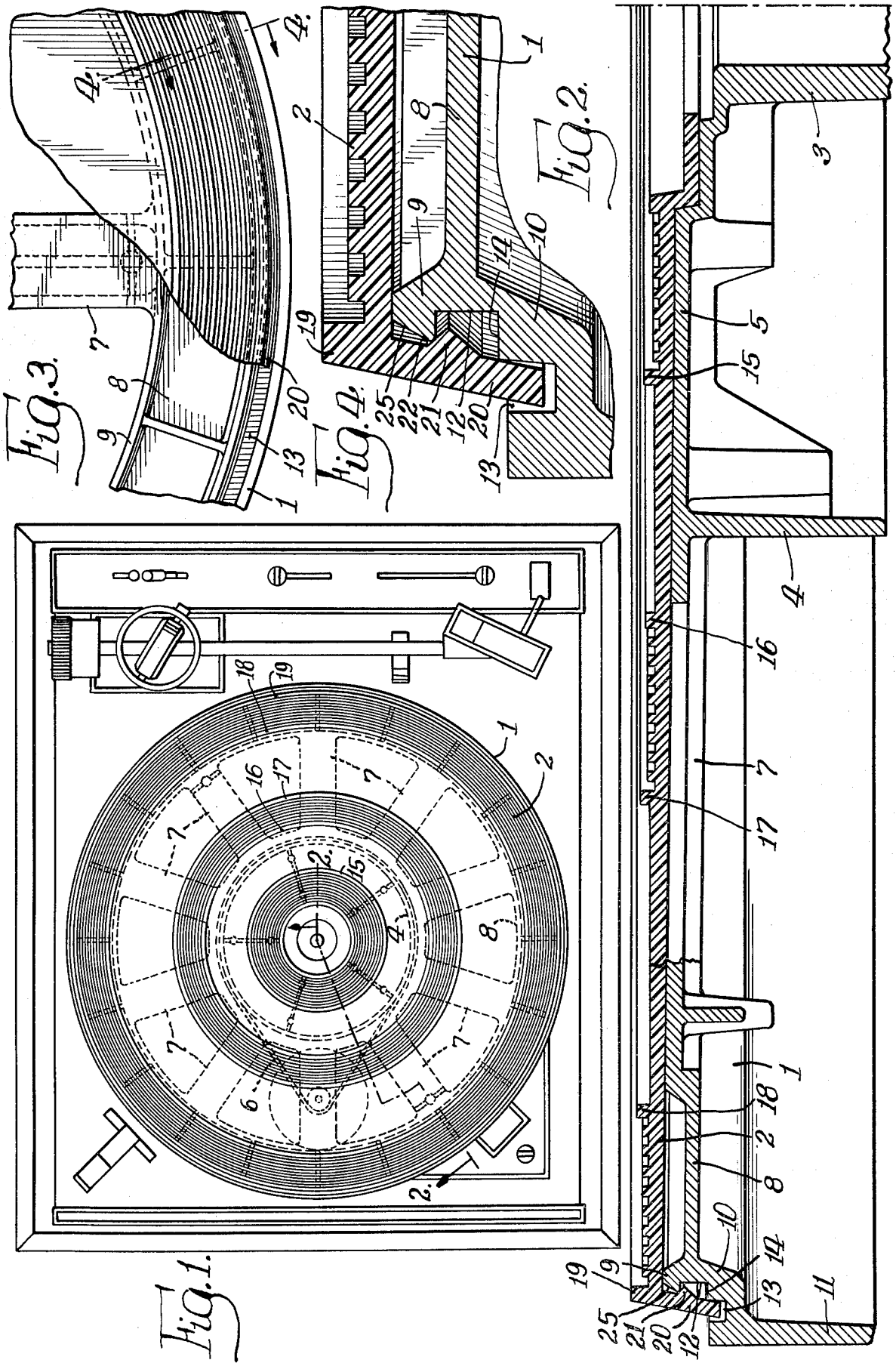

PHONOGRAPH TURNTABLE AND MAT ASSEMBLY

BRIEF SUMMARY OF THE INVENTION

The invention provides a metal turntable and a cover mat of a synthetic elastic material in the shape of an inverted flat pan with a depending flange. The turntable has an upwardly projecting central portion over which the mat is extended and then forced down into interlocking relation with the metallic turntable. The parts are held together by virtue of their interfitting relation and the elasticity of the flange and without the necessity for adhesives or fillers. This provides accuracy, permanency and a striking appearance.

BACKGROUND OF THE INVENTION

Typically, cover mats are employed on record turntables to provide in each case a quiet resilient top surface whereon the record to be played is placed. Such cover mats are normally formed of a soft rubber-like or resilient plastic material and are secured to the top surface of the record turntable through the use of adhesives. However, time, temperature and humidity often adversely affect the adhesive material and permit such cover mats to become raised (in portions thereof) through failure of the adhesive bond. Where such cover mats are not adequately secured to the top surface of the turntable to present a flat surface, then the playing of a record often produces a "wow" effect. Also, damage to the record, tone arm and stylus may occur due to the uneven surface created by the failure of the adhesive to maintain the mat in a flat position.

It has been reported that cover mats have been secured to turntables through the use of snap-on or interlocking grooves or ridges employed on the downwardly extending skirts of cover mats. However, in such situations adhesives have also been continued to be employed to secure such cover mats to the top surface of the record turntable. In addition, in such situations, the skirt has merely extended downwardly over a short rough edge of the turntable which has created difficulty in operation due to the radial movement of the skirt outwardly during operation of the record turntable. Further, since such cover mats are often formed by a plastic-molding process wherein the downward edge of the skirt may vary in length, even slightly, peripheral rotary movement of the skirt produces a visual wobbling effect in the appearance of the turntable moving unevenly, particularly when the user observes from the side, the irregular downwardly extending edge of the skirt in such an arrangement.

It is therefore desirable to provide a record turntable containing a cover mat securely placed thereon without the need for adhesives, and in which a wobble effect or appearance due to an uneven downwardly extending skirt of the cover mat does not occur.

OBJECTS OF THE INVENTION

It is an object of the invention to provide a record player turntable with a cover mat secured thereto without the need for an adhesive to bond the cover mat to the top surface of the record turntable.

Another object of our invention is to provide a record turntable cover mat having a downwardly extending flange wherein the flange is secured against relative movement in operation of the record player.

A further object of our invention is to provide a record turntable and flexible cover mat secured thereto, which cover mat has a downwardly extending flanged skirt whereby the lower edge of the flange or skirt having any imperfection or uneven surface therein is hidden within a peripheral recess extending about the outer edge of the turntable.

Another object is to provide a turntable having a massive appearance of a thick resilient mat insulating the record from any external noises and supported by a massive rotating metal disc.

BRIEF DESCRIPTION OF THE DRAWINGS

FIG. 1 is a plan view of a record player employing the turntable of our invention;

FIG. 2 is a vertical section taken on the line 2—2 through the axis of the turntable, looking in the direction of the arrows;

FIG. 3 is an enlarged fragmentary plan view of a segment of the periphery of the turntable showing the application of the mat to the rim of the turntable; and FIG. 4 is a fragmentary section taken on the line 4—4 showing on an enlarged scale the interlocking relation of the turntable flange and the annular grooves at the junction of the top and the skirt of the turntable.

DESCRIPTION OF THE PREFERRED EMBODIMENT

The present invention is concerned with two connected elements of a record player—namely, the turntable 1 and the mat 2. The turntable 1 is mounted for rotation on a vertical axis by means of the hub 3 which is mounted on a vertical shaft (not shown) supported in the frame of the record player. The driving drum 4 is connected to the lower side of the turntable and is adapted to be driven by a belt 6 shown in dotted lines in FIG. 1.

To the outer periphery of the web 5 (FIG. 2) there are connected a series of ten flat radial arms 7—7 which at their outer ends are connected to the annular flat web portion 8 which forms a rim connecting said arms 7 in the fashion of a wheel. The flat rim 8 in turn supports annular peripheral elements comprising an upwardly extending flange 9 above the said flat rim 8 and a diagonally downwardly and outwardly extending conical web 10 which is integral with the rim 8 and flange 9. A cylindrical depending flange 11 is joined to the outer rim of the web 10 and is integral with the said web 10.

The web 10 has two adjacent square bottom grooves formed therein, the upper groove 12 being square bottomed and faces radially outwardly. The outermost groove 13 also is square bottomed and faces axially and intersects the groove 12 at an annular ridge 14 which in effect separates the two grooves. The metallic turntable is covered over the top and part way down the side by a plastic mat 2, the upper surface of which is adapted to receive and support phonograph records of the diameters corresponding to the location of upwardly extending ridges 15, 16, 17, 18 of appropriate axial height designed not to interfere with each other in the support of appropriate sized records.

The mat comprises a downwardly extending conical flange 20 of substantially uniform thickness except for the internal bead 21 of angular cross section. The bead 21 when the mat is assembled on the turntable body extends into the square bottom groove 12 which lies in a horizontal plane. The lower end of the hollow conical flange 20 of the mat extends into the circular upwardly facing groove 13, the proportions being such that when the parts are assembled as shown in FIGS. 2 and 3, the upper inclined edge of the triangular bead 21 engages the upper edge of the square bottom groove 12 at the same time that the upper rim or flange 9 of the turntables engages the interior bottom of the mat as shown in FIGS. 2 and 4. The downwardly extending flange 20, at its lower end margin, extends into the groove 13 and preferably engages the inner side wall of the groove 13 as illustrated in FIG. 4. In the preferred form of the invention the mat, when in unstressed condition and upon being applied to the top of the turntable, will have the lower end of the flange 20 lying within the radius of the outer wall of the groove 13 when the bead 21 is resting upon the inclines upper outer surface 25 of the upstanding flange 9 of the turntable.

Then to permanently assemble the mat and the turntable, the mat, with the lower edge of its depending flange 20 registering with the groove 13 vertically, and with the bead 21 engaging the outward sloping flange 25, is pressed downwardly with uniform pressure around the periphery of the mat and with even support from below to the metallic turntable.

The inclined surfaces 25 and the upwardly and inwardly sloping surface of the lower side of the bead 21, when the corresponding parts are pressed together, will cause expansion of the central part of the flange 20 of the mat which comprises the bead 21 since this mat is a unitary molded part of synthetic elastic rubber-like plastic material. A suitable material for this purpose is Dupont "Alathon EVA 31-32". The stretching which ensues upon forcing the ridge 21 down over the inclined conical surface 25 tends to expand the outside diameter of the central and lower end of the conical flange 20. Preferably the proportions and characteristics of the material allow the bead 21 to be expanded over the edge 22 of the upper groove without throwing the outer diameter of the lower edge of the flange beyond the outer wall of the groove 13. The lower rim of the flange 20 tends to expand under the radial and axially downward pressure between the inclined side of the bead 21 and the engaged adjacent wall of the groove 21. Thereby the conical flange of the mat member may be permanently united with the grooves of the turntable flange by merely pressing these parts together in register with each other. If desired to expedite and facilitate assembly, an inwardly sloping funnel-like guide may be employed to hold the confines of the lower outer edge of the mat member at the flange 20 in position to guide the flange of the mat member into the lower groove 13.

We claim:

1. A phonograph turntable comprising in combination a circular metal turntable body (1) having a hub (3) adapted to be mounted coaxially on a vertical rotatable shaft, said metal turntable body having a peripheral depending cylindrical metallic flange (11) coaxial with said hub, a diagonally downwardly and outwardly extending conical metal web (10) forming a junction between said metal turntable body and said cylindrical metallic flange (11), a first horizontally disposed circular groove (12) having a vertical axis and being formed in said conical metal web and opening out radially with respect to said vertical axis, a second circular groove (13) opening out axially, said first groove (12) and said second groove (13) having their adjacent sides intersecting substantially at right angles in an annular ridge (14), a resilient plastic circular mat (2) disposed on the top of said turntable body, said mat having a depending flange (20) and having an inwardly directed annular ridge (21) on said depending flange (20) extending into an interlocking relation with said first-named groove (12), said flange (20) of the mat having its free edge extending downwardly and disposed within said second-named groove (13), the groove (13) having a diameter slightly greater than the thickness of the depending flange (20) disposed therein.

2. The phonograph turntable of claim 1 wherein the groove (12) and the groove (13) are both substantially square-bottomed grooves.

3. The phonograph turntable of claim 1 wherein the depending flange (20) of the mat has imperfections in the lower ends thereof, the imperfections hidden from visual observation by groove (13).

4. The phonograph turntable of claim 1 wherein the mat (2) and the depending flange (20) are secured to the turntable body (1) solely by the interlocking relationship of the ridge (21) with groove (12).

5. A turntable body comprising a circular horizontal metal plate (1) having a central downwardly extending mounting hub (3) for supporting the plate for horizontal rotation on a vertical axis, said plate comprising a peripherally connected downwardly extending substantially cylindrical flange (11), a conical web portion (10) forming the junction of the outer margin of said plate (1) with said flange (11), thereby being a peripheral radially extending groove (12) disposed in a horizontal plane and being extended radially into said web portion, there being an upwardly facing axially extending groove (13) contiguous to said first groove extended into said web portion, said grooves (12) and (13) intersecting and defining an annular ridge (14) between them, a resilient plastic circular mat (2) overlying said circular plate (1), said mat (2) having a peripheral axially extending flange (20) projecting downwardly over said first groove (12) and having its lower edge projecting into said axially extending groove (13), the groove (13) having a diameter slightly greater than the thickness of the depending flange (20) disposed therein, said last-named flange (20) of the mat having an internal radially inwardly projecting annular ridge (21) extending into said first-named groove (12), said mat flange (20) being under tension, said latter flange (20) and said ridge (21) of the mat being held in interlocking annular ridge (21) on said depending flange (20) extending into an interlocking relation with said first-named groove (12), said flange (20) of the mat having its free edge extending downwardly and disposed within said second-named groove (13), the groove (13) having a diameter slightly greater than the thickness of the depending flange (20) disposed therein.

* * * * *